United States Patent [19]
Verner

[11] 3,775,578
[45] Nov. 27, 1973

[54] POLARITY REVERSAL SYSTEM FOR ELECTRICAL DISCHARGE MACHINING APPARATUS

[75] Inventor: Dalton R. Verner, Orchard Lake, Mich.

[73] Assignee: Colt Industries Operating Corp., New York, N.Y.

[22] Filed: Aug. 21, 1972

[21] Appl. No.: 282,486

Related U.S. Application Data

[62] Division of Ser. No. 122,830, March 10, 1971, Pat. No. 3,732,392.

[52] U.S. Cl.............................. 219/69 C, 219/69 G
[51] Int. Cl........................... B23p 1/08, B23p 1/14
[58] Field of Search .............. 219/69 C, 69 P, 69 G, 219/69 V; 335/185, 195

[56] References Cited
UNITED STATES PATENTS

| | | | |
|---|---|---|---|
| 2,273,819 | 2/1942 | Cooke et al. | 219/69 V |
| 3,496,321 | 2/1970 | Lobur | 219/69 C |
| 3,627,967 | 12/1971 | Bertolasi et al. | 219/69 C X |
| 2,783,411 | 2/1957 | Matulaitis | 219/69 G X |
| 2,623,136 | 12/1952 | Mekelburg et al. | 335/185 X |

*Primary Examiner*—R. F. Staubly
*Attorney*—Robert C. Hauke et al.

[57] ABSTRACT

A control system is provided with an electronic switch control network for maintaining a constant polarity gap output signal from a single or multiple electrode gap system independently of whether the electrical power conducting leads from the power source are connected to one or the other of the EDM gap elements. In a multiple gap setup, provision is made for independently changing polarity of the gap elements in the different gaps. The gap output signal which is ordinarily representative of gap voltage is then utilized in other associated EDM circuits such as for an example power feed control networks and machining pulse cut-off control networks to regulate their operation.

6 Claims, 2 Drawing Figures

POLARITY REVERSAL SYSTEM FOR ELECTRICAL DISCHARGE MACHINING APPARATUS

REFERENCE TO RELATED APPLICATIONS

This application is a divisional application of my U.S. Pat. 3,732,392 for "Polarity Reversal System for EDM Apparatus" issued on May 8, 1973.

BACKGROUND OF THE INVENTION

The field to which my invention relates is that known generally as electrical discharge machining, hereinafter sometimes referred to as "EDM." In this process, material is removed from an electrically conductive workpiece by electrical gap discharges which are caused to occur between a tool electrode and the workpiece. A servo feed system for the electrode or workpiece is used to provide relative movement and thus maintain an optimum gap spacing between the electrode and workpiece as the material is removed. A dielectric coolant liquid is circulated and recirculated, usually under pressure, through the gap during machining operation. For most reliable and predictable results, a power supply circuit of the independent pulse generator type is utilized to provide machining pulses of precisely controllable frequency and on-off time characteristic. During the machining operation, the gap may become bridged by workpiece or electrode particles to cause a condition commonly known as gap short circuit condition. This condition is accompanied by excessive localized heat which tends to damage both electrode and workpiece unless prompt corrective action is taken. Corrective action is provided by systems which have been devised to provide fast acting servo withdrawal and, alternately or concomitantly, interruption of machining current to the gap. A basic requirement of either system is that a reliable control output signal be received, normally from the matching gap itself, which signal indicates the level of gap voltage and the changes which are occurring or impending. Gap short circuit condition is normally accompanied by an abrupt drop of gap voltage. This change in gap voltage signal is usually monitored by sensing leads which are connected to the two gap elements. As different tool electrode and workpiece material combinations are used, it sometimes becomes necessary to change the polarity from the standard condition, that is, with electrode negative and workpiece positive, to the opposite or reverse polarity condition. This, of course, causes a problem with respect to the sensing leads and to the other internal control circuits for servo control or current cut-off control. My polarity reversal system is able to overcome these problems and to provide a ready means for changeover of gap polarity in one machining gap or in a plurality of machining gaps. The polarity of gap output signal is maintained constant for controlling the various functions of the associated circuitry.

BRIEF DESCRIPTION OF THE DRAWINGS

The following is a brief description of the drawings in which like numerals and letters are used to refer to like elements where they occur throughout the several views.

DESCRIPTION

Figure 1:
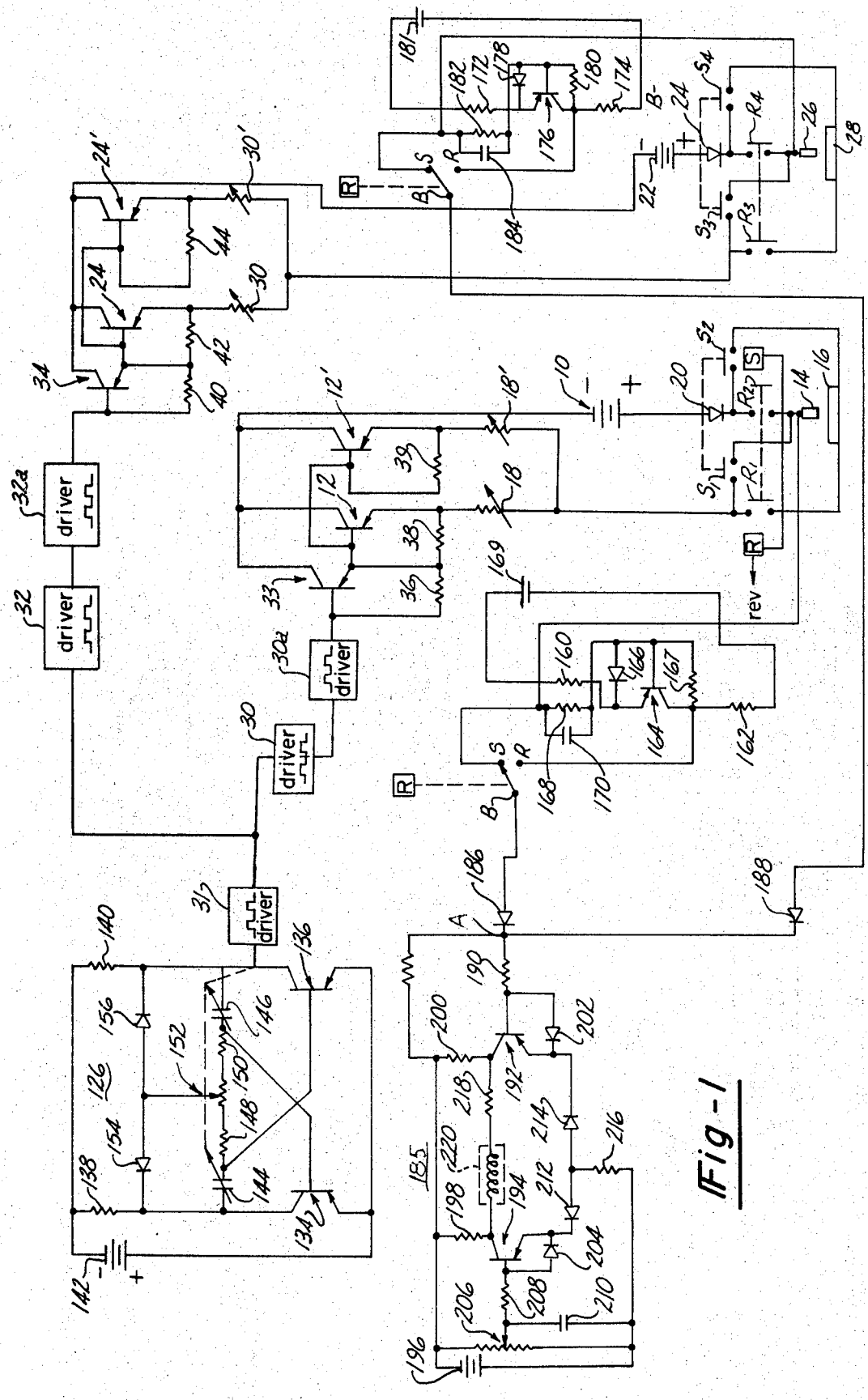
FIG. 1 is a combined schematic and block diagrammatic showing of an electrical discharge machining power supply with a polarity reversal system as used in conjunction with a servo control circuit.

Referring now to FIG. 1 of the drawing, an EDM system is shown which includes multiple machining gaps. A main machining power source 10 for the left hand machining gap is shown connected in series with a pair of output transistors 12 and 12' and in series with that machining gap comprising a tool electrode 14 and a workpiece 16. The magnitude of gap cutting current is controlled by the setting of a pair of resistors 18, 18'. A rectifier 20 is connected in series between electrode 14 and the positive terminal of the power source 10.

A second machining gap is shown at the right hand side of the drawing, which gap similarly includes a main machining power source 22 and a pair of output stage transistors 24, 24' connected with that machining gap comprising a tool electrode 26 and a workpiece 28. Gap current magnitude is controlled by the setting of a pair of resistors 30, 30'. A rectifier 24 is shown connected in series between the electrode 26 and the positive terminal of the power source 22. It will be seen that the EDM power supply circuit illustrated is suitable for operation in either of several different modes. For one type of operation, it is possible to combine the two output circuits to machine simultaneously two or more holes in a common workpiece, in which case workpieces 16 and 28 would comprise the same electrically conductive body. Alternately, for another common type of operation, it would be possible to maintain simultaneous cutting operation on two separate and spaced workpieces 16 and 28 in the manner illustrated. The present invention is of particular importance with respect to that system in which a plurality of electrodes are mounted on a common machine tool ram, controlled by a single servo feed system and used to machine a number of holes in the same workpiece or in a number of workpieces at the same time.

Included in circuit with the two or more output stages shown are corresponding intermediate drive stages 30, 30a, and 32, 32a, respectively. In connection with the left hand machining gap, a final drive stage transistor 33 is connected in the manner shown to operate the output transistors 12, 12'. A final drive stage transistor 34 is connected to drive the output stage for the right hand machining gap including the output transistors 24 and 24'. Resistors 36, 38 and 39 are connected across the respective base emitter junctions of their associated transistors 33, 12 and 12' to protect them from excess turn off voltages. Similarly, a plurality of resistors 40, 42 and 44 are connected across the respective base emitter junctions of their associated transistors 34, 24 and 24' to provide protection from excess turn off voltages.

A pulser means embodied as a multivibrator stage 126 is used to provide a pulse output to operate the several output stages. Included in the multivibrator 126 are a pair of PNP transistors 134 and 136, which transistors are biased and coupled for alternate operation in the astable multivibrator mode. The transistors 134 and 136 are connected respectively through a pair of load resistors 138 and 140 to the negative terminal of a DC source 142. A pair of variable capacitors 144 and 146 are adjustable by ganged control and function to cross-couple the collectors of the transistors 134, 136, each to the opposing transistor base. A pair of signal limiting resistors 148, 150 and a potentiometer 152 are included in the multivibrator circuit with the on-off time ratio of the multivibrator output controlled by the setting of the potentiometer 152. A pair of blocking diodes 154 and 156 are connected as shown in circuit with the movable contact of the potentiometer 152. The frequency of the multivibrator 126 operation and hence the frequency of the machining power pulses furnished to the machining gap or gaps may be selectively altered by changing the value of the capacitors 144, 146 through a ganged switch arrangement such as is indicated by the dash lines. The pulse output from the multivibrator 126 is suitably amplified and resquared through a first common intermediate drive stage 31 and then through the separate following driver stages 30, 30a and 32, 32a already referred to above. The drive stages 30 and 30a are associated with the left hand machining gap, while the driver stages 32 and 32a are associated with the right hand machining gap.

While the present invention employs transistors as electronic switches, the invention is not so limited, but with proper redesign of the circuit by one skilled in the art any electronic switch may be substituted. By "electronic switch" I mean any electronic control device having three or more electrodes comprising at least two power electrodes acting to control curve flow in the power circuit, the conductivity of the power circuit being controlled by a control electrode within the switch, whereby the conductivity of the power circuit is regulated statically or electrically without movement of any mechanical elements within the switch. Included within this definition by way of illustration but not limitation are electronic tubes, transistors, silicon controlled rectifiers and the like.

Attention will now be given to the polarity control networks which are associated directly with the two machining gaps. A relay controlled network is shown associated with the diode 20 of the left hand gap including the electrode 14 and the workpiece 16. A pair of relays are used to control the switching of two pairs of associated movable contacts to provide the several connections required to reverse the polarity to the two gap elements. At the left hand side of the gap, a relay R is shown, which relay controls a pair of jointly operable relay contacts indicated by the letters $R_1$ and $R_2$. A second relay S is connected at the right hand side of the gap which relay controls the joint movement of contacts $S_1$ and $S_2$. It will be seen that responsive to the actuation of relay R through a suitable control switch the contacts $R_1$ and $R_2$ will be moved leftwardly and a reverse polarity connection will be made in which the electrode 14 is maintained positive and the workpiece 16 negative. More specifically, this is accomplished by closing through contact $R_1$ the connection between the common lower end terminals of the resistors 18, 18′ and the workpiece 16. At the same time, the closure of the contact $R_2$ completes the circuit through the diode 20 from the positive terminal of the DC source 10 to provide a positive potential to the tool electrode 14. In the standard polarity condition, the relay S will be energized to place its normally opened contacts $S_1$ and $S_2$ in their lower, closed position. Closure of contact $S_1$ will connect the lower terminals of resistors 18, 18′ to the upper end of the electrode 14, thus permitting electron flow thereto from the negative terminal of the power source 10 through the collector emitter junctions of transistors 12 and 12′. The closure of the right hand contact $S_2$ will provide current flow through diode 20, through the contact $S_2$ to the workpiece 16.

The polarity connections for the right hand gap are provided by a substantially identical switching network as that just described in connection with the left hand gap. Responsive to the energizing of the relay S, a pair of jointly operable contacts $S_3$ and $S_4$ will be closed to provide standard polarity connection. Responsive to the energization of the relay R, its associated contacts $R_3$ and $R_4$ will be closed to provide the reverse polarity connection to the machining gap.

It will now be seen that there are available from the multiple machining gaps a pair of signals which indicate the magnitude of gap voltage. The gap signals will be maintained of a like polarity according to the selected energization of the relay R or of the relay S. To maintain the output signal to the servo system of a constant polarity independently of the relays selected, there is provided a pair of control networks, each of which network is associated with one individual gap. With respect to the left hand gap, the network includes a source of DC potential 169 and a pair of series resistors 160 and 162 connected in series respectively with the emitter and the collector of a PNP transistor 164. A protective diode 166 is connected across the emitter base junction of the transistor 164. A resistor 167 is connected across its base collector junction. The electrode 14 of the machining gap is connected through a parallel RC network, including a resistor 168 and a capacitor 170, to provide a normal minus signal from the output terminal labeled S when the setting for the machining gaps and for the polarity system is of the standard polarity. Alternately, where the polarity is of the reverse order, the movable contact, at the left side shown in its uppermost or S relay operated position, will be moved downwardly through the energization of the associated control relay R. While the relays denoted R are shown separately for convenience of illustration, it will be understood that relay control of the several contacts indicated and identified by the several R prefix designations may be operated through a single relay element. Likewise, control over the several contacts variously identified with the S prefix designations may be exercised either through one or through a plurality of relay elements. The amplifier inverter stage, including resistor 168, capacitor 170, transistor 164, resistor 167, and resistor 162, gives a negative polarity control signal for the reverse polarity connection.

A second control network is associated with the right hand machining gap, which network includes a source of potential 181 and a pair of resistors 172 and 174 connected respectively in series with the emitter and collector of a transistor 176. A protective diode 178 is connected across the emitter base junction, while a resistor 180 is connected across the collector base junction of the transistor 176 to protect it against excess turn off voltages. A signal input network, including a resistor 182 and a capacitor 184, is connected in series with the base of the transistor 176 for its turn on. Again, responsive to the energization of the relay R, the movement of the movable contact between the positions S and R may be controlled. We thus have two control outputs provided from the two network terminals labeled B.

In the FIG. 1 showing, the two outputs are connected to a utilization means which comprises a servo control circuit 185 shown at the lower left hand side of the drawing. A pair of like poled diodes 186 and 188 are connected as shown to a point A at the right hand terminal of the servo control network. Also connected in the input of the servo control network is a signal resistor 190. A differential amplifier is included in the servo circuit and includes a pair of PNP transistors 192 and 194. A DC source 196 has connected to its negative terminal a pair of load resistors 198 and 200, each associated with one of the two transistors 194, 192. The transistor 192 further has a protective diode 201 connected across its base emitter junction. The transistor 194 similarly has a protective diode 204 connected across its base emitter junction. The DC source 196 together with a potentiometer 206 provide a selectively adjustable reference voltage, which voltage is coupled through a signal resistor 208 to the base of the transistor 194. A capacitor 210 is connected between the movable contact of the potentiometer 206 and the positive terminal of DC source 196. A series resistor 216 is coupled between the positive terminal of the source 196 and the anodes of a pair of diodes 212 and 214. A series resistor 218 and a servo control coil 220 are coupled between the collectors of the transistors 192 and 194. It will be understood that servo control coil 220 is operatively connected to control the operation of a servo motor of the electrohydraulic type in a manner well known in the EDM art. The servo feed system may also be of the electrical motor driven type in which case one of the motor windings could be used as the electrical control element. An example of a complete electrohydraulic type servo system may be found in Robert S. Webb. U.S. Pat. No. 3,230,412 entitled "SERVO FEED APPARATUS FOR ELECTRICAL DISCHARGE MACHINING," which patent is of common ownership herewith.

It will be seen that a preset reference voltage is connected to the control electrode or base of the transistor 194, while a gap control voltage signal which is of variable magnitude but always has the same polarity, is presented to the control electrode or base of the right hand transistor 192. Responsive to a significant drop of gap voltage at either of the two gaps being sensed, the signal at the base of the transistor 192 will drop. During a gap short circuit condition, the transistor 194 will be turned on, while the transistor 192 will be turned off. Accordingly, the direction of electron flow will be through the resistor 198, through the collector emitter junction of the transistor 194, through the diode 212 and the resistor 216 to the positive terminal of the DC source 196. At the same time, there will be an electron flow from the negative terminal of the DC source 196, through the resistor 200, through the resistor 218, and leftwardly through the servo control coil 220 to provide a continuing up-feed direction of servo operation for the duration of the gap short circuit condition.

During normal gap voltage level, the phasing of the transistors 192, 194 will be the opposite one. Transistor 192 will be turned on and transistor 194 off. This will result in electron flow through the resistor 200, through the collector emitter junction of the transistor 192, through the diode 214 and the resistor 216 to the plus terminal of the DC source 196. At the same time, there will occur an electron flow from the negative terminal of the DC source 196 through the resistor 198, rightwardly in the down-feed direction through the servo coil 220 and through the resistor 218 and then through the transistor 192 and in the path previously described.

It will thus be seen that I have through the embodiments shown in FIG. 1 provided a constant control output for the servo system without respect to the selected polarity of the gaps.

Figure 2:
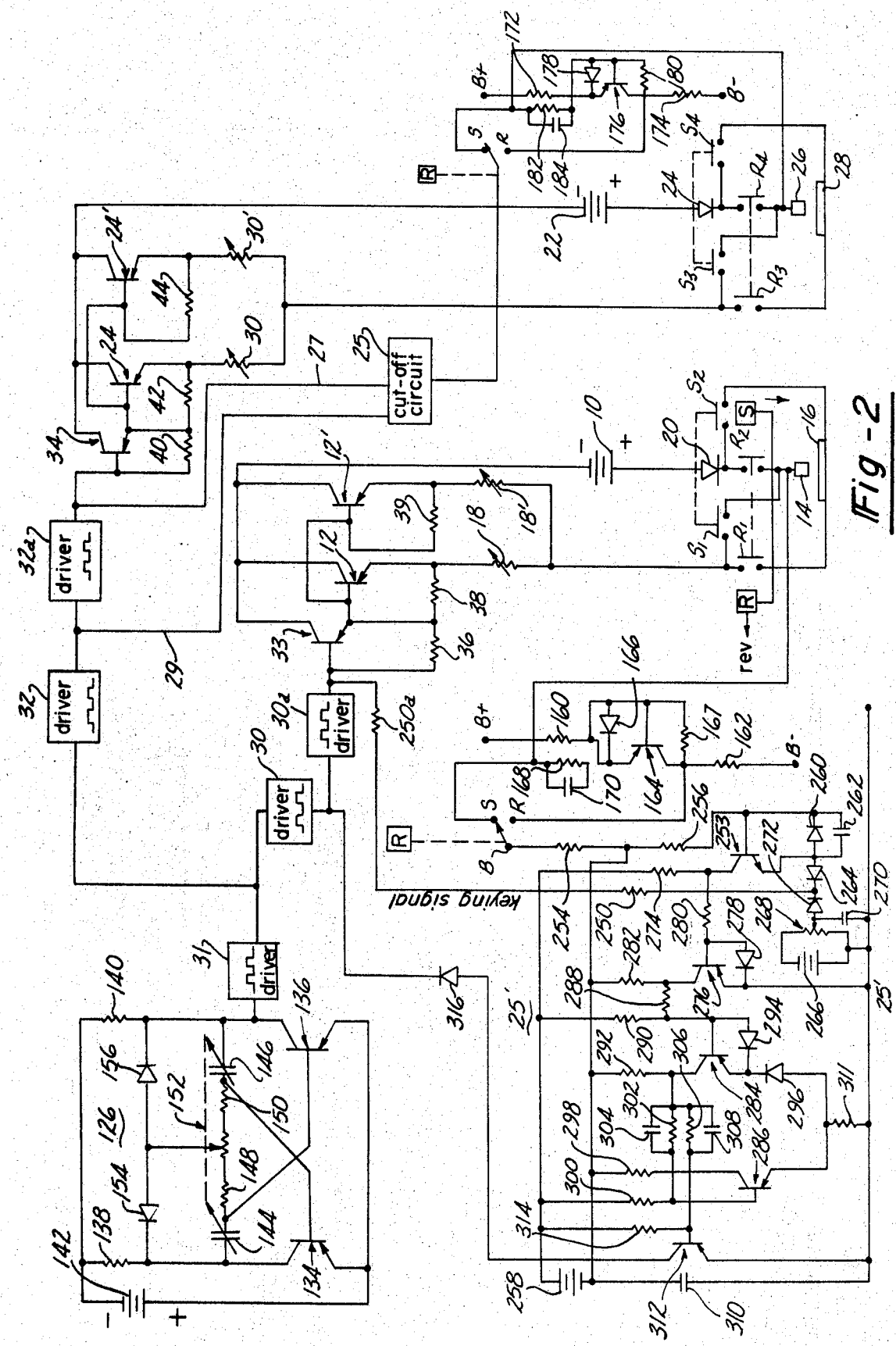
FIG. 2 is a drawing substantially similar to FIG. 1 in which the polarity reversal system is illustrated in conjunction with a machining current cut-off circuit.

FIG. 2 shows a system identical to FIG. 1 so far as the polarity reversing relays and the polarity control networks for each gap are concerned. In this case, however, the constant polarity output signals from the two control networks are used to control separate cut-off circuits associated with the output stages for the two different gaps. With respect to the right hand gap including the electrode 26 and the workpiece 28, there is provided a cut-off circuit 25 which is shown with the two signal leads, both coupled to the several input stage for the transistors 24, 24'. The right hand lead 27 provides to the cut-off circuit 25 a signal representative of gap on-time which provides a keying signal for the cut-off circuit. The left hand lead 29, which is shown with its upper end connected between the drive stages 32 and 32a, is used to provide a control cut-off signal for the drive. Essentially, the cut-off operation is achieved by shunting drive signal from the output electronic switch network. A second cut-off circuit 25' is shown in full detail at the left hand side of the drawing. The components and mode of operation of the cut-off circuits 25 and 25' are identical. Included in the cut-off circuit 25' is the input received from the polarity control network. A keying signal lead is connected through a pair of limiting resistors 250, 250a from the output of driver stage 30a. Included in the first stage of cut-off circuit 25' is a transistor 253, which transistor has its base in series with a drive signal resistor 254 and a base resistor 256. The base resistor 256 has its upper terminal connected to the negative terminal of a DC source 258. The transistor 253 further has its base emitter junction shunted by diode 260 and a parallel capacitor 262. The keying signal input, which is of a minus polarity, is passed through a diode 264 to the emitter of the transistor 253. A reference voltage is coupled to the cathode of the diode 264, which reference voltage includes a DC supply 266, a shunt potentiometer 268 and a capacitor 270 connected between the positive terminal of the bias source 266 and the movable contact of the potentiometer 268. A diode 272 is connected between the keying signal input and the reference voltage. Connected in series with the collector of the transistor 253 is a load resistor 274. A transistor stage next following includes a PNP transistor 276 which has a protective diode 278 across its base emitter junction and a current limiting resistor 280 connected in series with its base. A collector load resistor 282 is further connected between the transistor 276 collector and the negative terminal of DC source 258. The next stage in the cut-off circuit includes a pair of alternately conductive transistors 284 and 186. The transistor 284 is connected to the output of the transistor 276 through a signal limiting resistor 288 with a bias furnished to its base through a resistor 290. The collector of the transistor 284 is connected to a load resistor 292 and it further has a protective diode 244 connected across its base emitter junction. A second diode 296 with a polarity in the manner shown is connected in series with the emitter of the transistor 284. The transistor 286 has connected to its collector a load resistor 298, with a bias resistor 300 connected between its base and the positive terminal of the DC source 258. The circuit is completed by a pair of RC networks, including a shunt network with resistor 302 and capacitor 304 and the shunt network including resistor 306 and capacitor 308. A resistor 311 is connected in the common emitter connection of the two transistors 284 and 286 as shown.

The control output from cut-off circuit 25' is provided from the collector of a final cut-off transistor stage including a transistor 312, which transistor has its base connected to the left hand terminal of the RC shunt network including resistor 306 and capacitor 308. Responsive to the conduction of the transistor 312, the drive signal is shunted away from the next following stage 30a through a diode 316. During a gap short circuit condition, the following is the sequence of operation of the several stages of the cut-off circuit: the transistors 253 and 276 are turned on, the transistor 284 is switched off, and the transistor 312 is finally turned on to interrupt drive signal.

The operation of the cut-off circuit 25 or 25' thus proceeds independently of whether the gap polarity is standard or reversed. The mode of operation possible now makes it feasible to provide a single pulser means, such as the multivibrator 126, to operate a number of drive stages and electronic swtich output stages to provide cutting over a plurality of machining gaps at the same time. The cut-off circuit is operable beyond the first common drive stage of the machining gap circuits so that if one of the several gaps is in a shorted condition, it may temporarily be interrupted while machining is permitted to progress uninterrupted at the other gaps. This arrangement provides much greater flexibility and permits ready change-over of the power supply between different types of EDM operation. Of particular importance to the embodiments of both FIGS. 1 and 2 is the arrangement for polarity reversal and the control network for providing a constant polarity control signal from one gap or from the several gaps independently of the preselected gap polarity.

I claim:

1. In an electrical discharge machining apparatus for machining at least one conductive workpiece by electrical discharges passed from a plurality of spaced tool electrodes across a like plurality of dielectric coolant filled gaps, a periodically operated electronic output switch and a separate DC power source operatively connected to each of said gaps for providing machining power pulses thereto, wherein the improvement comprises a system for selectively reversing the relative polarity of said tool electrodes and said workpiece, said system comprising for each gap a first group of switching means, each operatively connected between the output of each of said switches and a related one of said electrodes and a second group of switching means, each operatively connected between the output of each of said switches and said workpiece, said first group of switching means selectively actuable for connecting each of said output switches to their respective tool electrode and, at the same time, connecting like terminals of said sources to said workpiece, said second group of switching means selectively actuable for connecting each of said additional output switches to said workpiece and at the same time connecting like terminals of said sources each to a different one of said tool electrodes, and a like phased diode connected between each terminal of said sources and the associated one of said second group of switching means.

2. The combination as set forth in claim 1 wherein said first and second switching means comprise a pair of electromagnetically operated relays, said relays operatively connected to and controlling movable contacts for providing the aforementioned connections.

3. In an electrical discharge machining apparatus for machining a plurality of conductive workpieces by electrical discharges passed from a like plurality of spaced tool electrodes across a plurality of dielectric coolant filled gaps, a periodically operated electronic output switch and a separate DC power source operatively conneced to each of said gaps for providing machining power pulses thereto, wherein the improvement comprises a system for selectively reversing the relative polarity of said tool electrodes and said workpieces, said system comprising for each gap a first group of switching means, each operatively connected between the output of one of said switches and the related one of said electrodes and a second group of switching means, each operatively connected between the output of each of said switches and said workpieces, said first group of switching means selectively actuable for connecting each of said output switches to their respective tool electrode and for connecting like terminals of said sources to said workpiece, said second group of switching means selectively actuable for connecting each of said output switches to said workpieces and connecting like terminals of said source each to a different one of said tool electrodes, said first and said second groups of switching means independently controllable to provide at the same time different polarity connections across individual ones of said gaps.

4. The combination as set forth in claim 3 wherein said output switches comprise transistors, each having their principal electrodes operably connected between one of said sources and its associated gap for providing the machining power pulses thereto.

5. The combination as set forth in claim 4 wherein a pulse generator is coupled to the control electrodes of all of said transistors for triggering them into conduction in unison to provide said pulses.

6. The combination as set forth in claim 5 wherein said pulse generator comprises a multivibrator selectively adjustable to control the frequency and on-off time of said pulses.

* * * * *